United States Patent
Yamamoto et al.

(10) Patent No.: US 7,192,371 B2
(45) Date of Patent: Mar. 20, 2007

(54) SYSTEM AND METHOD OF CONTROLLING V-BELT TYPE CONTINUOUSLY VARIABLE TRANSMISSION

(75) Inventors: Masahiro Yamamoto, Kanagawa (JP); Yoshihisa Kodama, Yokahama (JP); Shigeki Shimanaka, Kanagawa (JP); Katsumi Doihara, Kanagawa (JP)

(73) Assignee: Jatco Ltd, Fuji (JP)

( * ) Notice: Subject to any disclaimer, the term of this patent is extended or adjusted under 35 U.S.C. 154(b) by 630 days.

(21) Appl. No.: 10/673,919

(22) Filed: Sep. 30, 2003

(65) Prior Publication Data

US 2004/0116244 A1 Jun. 17, 2004

(30) Foreign Application Priority Data

Oct. 1, 2002 (JP) ............................. 2002-288396

(51) Int. Cl.
*F16H 61/00* (2006.01)
*F16H 61/664* (2006.01)
(52) U.S. Cl. .............................. 474/18; 474/28; 477/45
(58) Field of Classification Search ................. 474/18, 474/28; 477/45–50, 39, 41; 701/51, 61
See application file for complete search history.

(56) References Cited

U.S. PATENT DOCUMENTS

| 4,736,655 | A | * | 4/1988 | Kumura et al. ............... 477/48 |
| 5,042,323 | A | * | 8/1991 | Murano et al. ............... 477/45 |
| 5,063,816 | A | * | 11/1991 | Soga et al. .................... 477/39 |
| 5,207,617 | A | * | 5/1993 | Kato et al. ..................... 474/28 |
| 5,249,482 | A | * | 10/1993 | Okahara et al. .............. 477/48 |
| 5,624,349 | A | | 4/1997 | Yamamoto |

FOREIGN PATENT DOCUMENTS

| JP | (63-53355 A | * | 3/1988 | .................. 474/18 |
| JP | (63-62955 A | * | 3/1988 | .................. 474/28 |
| JP | (09-250631 A | * | 9/1997 | |
| JP | (2001-330118 A | * | 11/2001 | |

* cited by examiner

*Primary Examiner*—Marcus Charles
(74) *Attorney, Agent, or Firm*—Foley & Lardner LLP (57) ABSTRACT

A system for controlling a V-belt type CVT is constructed to change a first position of a step motor to a second position of the step motor corresponding to a second target shift ratio if it is determined that the primary-pulley pressure fails to reach a predetermined value. The second target shift ratio is on the high-speed side with respect to a third position of the step motor corresponding to a third target shift ratio to be achieved if it is determined that the primary-pulley pressure reaches the predetermined value.

17 Claims, 7 Drawing Sheets

SYSTEM AND METHOD OF CONTROLLING V-BELT TYPE CONTINUOUSLY VARIABLE TRANSMISSION

BACKGROUND OF THE INVENTION

The present invention relates to a system and method of controlling a V-belt type continuously variable transmission (refer hereafter to as "CVT"), and more particularly, to the system and method which can prevent slippage of a V-belt from occurring when starting a prime mover of a vehicle after cruising the vehicle in a tractive manner.

With the CVT, the line pressure or source pressure is regulated through a shift control valve to obtain the hydraulic pressure to be supplied to a cylinder chamber of a primary pulley (refer hereafter to as "primary-pulley pressure"). The primary-pulley pressure is increased or decreased by the shift control valve to change the groove width of the primary pulley, changing the diameter ratio between the primary and second pulleys. With this, the shift ratio of the vehicle such as an automobile is controlled in a continuous manner. The shift control valve is connected, for example, to about the midpoint of a shift link constituting a mechanical feedback mechanism. The shift link has both ends connected to a movable flange of the primary pulley and a step motor or shift actuator, respectively. A return spring is disposed in a cylinder chamber for providing the hydraulic pressure to the secondary pulley (refer hereafter to as "secondary-pulley pressure") to maintain a given groove width with respect to a variation and sudden reduction in secondary-pulley pressure.

Some shift control systems for carrying out shift control of the CVT initialize, during vehicle stop and at prime-mover start, a motor for urging the shift control valve to stroke to a position corresponding to a desired shift-ratio command value so as to prevent inconsistency between a motor rotated position and a motor command value at prime-mover start. In this connection, refer to U.S. Pat. No. 5,624,349.

When cruising the vehicle equipped with such CVT in a tractive manner, the shift ratio remains low since the return spring is provided to the secondary pulley. Thus, the primary pulley rotates at high speed, causing a problem of reducing the durability of parts such as a bearing. In order to prevent such inconvenience, a return spring can be provided to the primary pulley so as to change the shift ratio to the high-speed side during tractive cruising.

When the prime mover of the vehicle is started after tractive cruising, however, the shift control system for controlling shift operation of the CVT, which cannot detect the shift ratio during tractive cruising, actuates the shift actuator in the same manner as at ordinary start of the prime mover. In this case, the shift actuator operates on the assumption that the pulley ratio is close to the lowest ratio. However, with the primary pulley not located at the lowest position and the step motor located at the lowest position as the fulcrums, the shift link is positioned to make the shift control valve allow communication between a drain port and a primary port. Thus, the primary-pulley pressure is not supplied to the primary pulley until the vehicle cruises to drive the step motor in the upshift direction, causing possible occurrence of belt slippage due to downshift and insufficient primary-pulley pressure, leading to a reduction in durability of the V-belt.

SUMMARY OF THE INVENTION

It is, therefore, an object of the present invention to provide a system and method of controlling a V-belt type CVT, which can prevent a reduction in durability of the V-belt due to downshift and belt slippage even when starting the prime mover of the vehicle after tractive cruising thereof.

The present invention provides generally a system for controlling a V-belt type CVT for a vehicle with a prime mover, which comprises: primary and secondary pulleys arranged on input and output sides, the pulleys having V-grooves, the pulleys being subjected to primary-pulley and secondary-pulley pressures produced from a line pressure; a V-belt looped over the primary and secondary pulleys to engage in the V-grooves; a shift actuator having a first position corresponding to a first target shift ratio, the shift actuator being operated to the first position to change a width of the V-grooves through a differential pressure between the primary-pulley and secondary-pulley pressures, conforming a shift ratio obtained from a rotational-speed ratio between the primary and secondary pulleys to the first target shift ratio; and an electronic control unit (ECU) which controls the shift actuator, the ECU being so programmed as to: determine if the primary-pulley pressure reaches a predetermined value within a predetermined period after a start of the prime mover; and change the first position of the shift actuator to a second position of the shift actuator corresponding to a second target shift ratio if it is determined that the primary-pulley pressure fails to reach the predetermined value, the second target shift ratio being on a high-speed side with respect to a third position of the shift actuator corresponding to a third target shift ratio to be achieved if it is determined that the primary-pulley pressure reaches the predetermined value.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
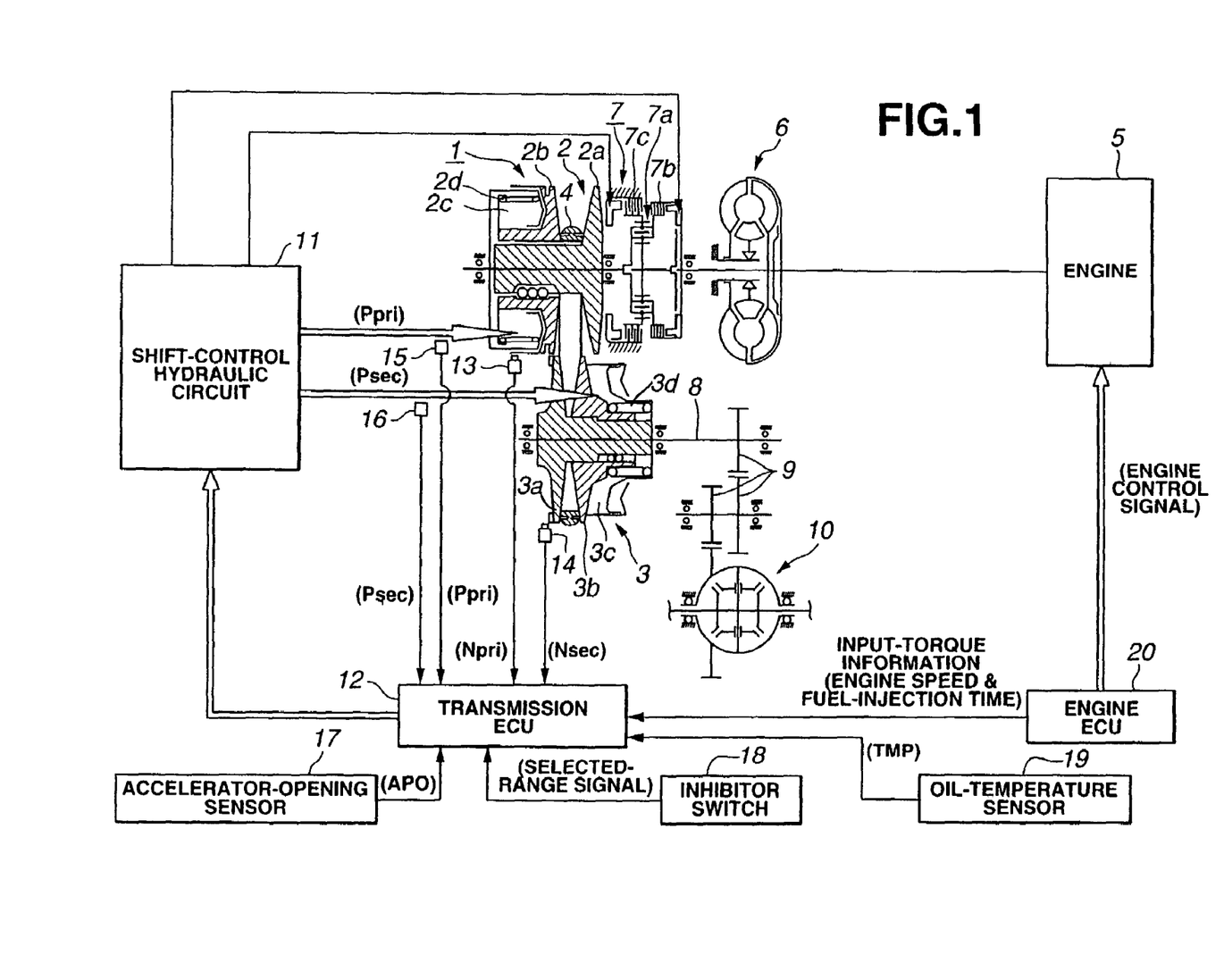
FIG. 1 is a block diagram showing a preferred embodiment of a shift control system for a V-belt type CVT according to the present invention.

Referring to the drawings, a description is made about a system for controlling a V-belt type CVT embodying the present invention. Referring to FIG. 1, a V-belt type CVT 1 comprises a primary pulley 2, a secondary pulley 3 having a V-groove aligned with that of the primary pulley 2, and a V-belt 4 looped over the primary and secondary pulleys 2, 3 to engage in the V-grooves. An engine or prime mover 5 is disposed coaxial with the primary pulley 2, and a lockup torque converter 6 and a forward/reverse switching mechanism 7 are arranged between the engine 5 and the primary pulley 2 in this order from the side of the engine 5.

The forward/reverse switching mechanism 7 comprises essentially a double-pinion planetary-gear set 7a including a sun gear coupled to the engine 5 through the torque converter 6 and a carrier coupled to the primary pulley 2. The forward/reverse switching mechanism 7 further comprises a forward clutch 7b for providing direct coupling between the sun gear and the carrier of the planetary-gear set 7a and a reverse brake 7c for fixing a ring gear of the planetary-gear set 7a. When the forward clutch 7b is engaged, the forward/reverse switching mechanism 7 transfers to the primary pulley 2 directly rotation input from the engine 5 through the torque converter 6, whereas when the reverse brake 7c is engaged, the switching mechanism 7 transfers thereto the input rotation as reduced and reversed in direction.

Rotation of the primary pulley 2 is transferred to the secondary pulley 3 through the V-belt 4, which is then transmitted to wheels, not shown, through an output shaft 8, a gear set 9, and a differential gear 10. In order to allow change of the transmission ratio or pulley ratio between the primary and secondary pulleys 2, 3 in the process of power transfer, i.e. change of the shift ratio, one of the flanges for defining the V-groove of each of the primary and secondary pulleys 2, 3 includes a stationary flange 2a, 3a, and another includes a movable flange 2b, 3b which can be displaced axially. The movable flanges 2b, 3b are biased toward the stationary flanges 2a, 3a by supplying to a primary-pulley chamber 2c and a secondary-pulley chamber 3c a primary-pulley pressure Ppri and a secondary-pulley pressure Psec produced from the line pressure as the source pressure, thereby putting the V-belt 4 in frictional engagement with the pulley flanges, thus allowing power transfer between the primary and secondary pulleys 2, 3. In this embodiment, the pressure acting area of the primary-pulley chamber 2c and that of the secondary-pulley chamber 3c are set equal to each other to avoid one of the pulleys 2, 3 from being larger in diameter than another, thus achieving downsizing of the CVT 1. Moreover, the CVT 1 is constructed such that return springs 2d, 3d are arranged in the primary-pulley and secondary-pulley chambers 2c, 3c, respectively, to prevent a variation in the groove width due to a variation and sudden change in hydraulic pressure and maintain the shift ratio on the high-speed side during tractive cruising.

At the time of shifting, the widths of the V-belt grooves of the primary and secondary pulleys 2, 3 are changed by a differential pressure between the primary-pulley pressure Ppri and the secondary-pulley pressure Psec produced in accordance with a target shift ratio as will be described later, thereby changing continuously the diameter of the circles of the pulleys 2, 3 with respect to the V-belt 4, thus allowing achievement of the target shift ratio.

A shift-control hydraulic circuit 11 controls the output of the primary-pulley pressure Ppri and the secondary-pulley pressure Psec as well as the output of the engagement pressure of the forward clutch 7b to be engaged when selecting the forward driving range and the reverse brake 7c to be engaged when selecting the reverse range. The shift-control hydraulic circuit 11 carries out such control in response to a signal from a transmission electronic control unit (ECU) 12. Thus, the transmission ECU 12 receives a signal from a primary-pulley rotational-speed sensor 13 for sensing a primary-pulley rotational speed Npri, a signal from a secondary-pulley rotational-speed sensor 14 for sensing a secondary-pulley rotational speed Nsec, a signal from a primary-pulley pressure sensor 15 for sensing a primary-pulley pressure Ppri, a signal from a secondary-pulley pressure sensor 16 for sensing a secondary-pulley pressure Psec, a signal from an accelerator opening sensor 17 for sensing an accelerator-pedal depression amount APO, a selected-range signal from an inhibitor switch 18, a signal from an oil-temperature sensor 19 for sensing a shift-operation oil temperature TMP, and transmission input-torque related signals, such as engine speed and fuel injection time, from an engine electronic control unit (ECU) 20 for controlling the engine 5.

Figure 2:
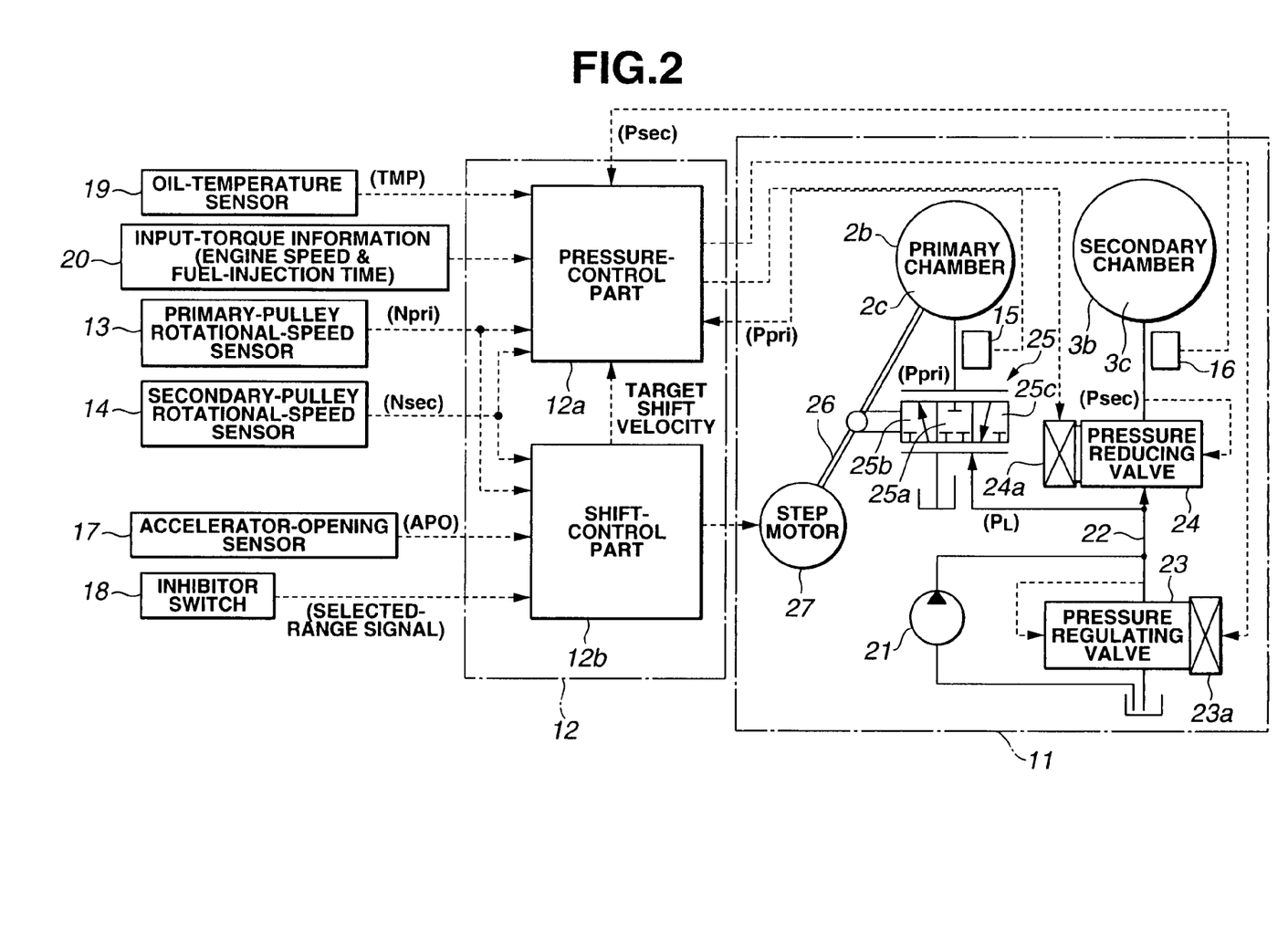
FIG. 2 is a diagram similar to FIG. 1, showing the shift control system.

FIG. 2 shows the shift-control hydraulic circuit 11 and the transmission ECU 12. First, the shift-control hydraulic circuit 11 is described. The hydraulic circuit 11 comprises an oil pump 21 driven by the engine 5, a hydraulic passage 22 to which the oil pump 21 supplies hydraulic oil or medium, and a pressure regulating valve 23 for controlling the pressure within the hydraulic passage 22 at a predetermined line pressure $P_L$. The line pressure $P_L$ within the hydraulic passage 22 is controlled by a pressure reducing valve 24 and supplied to the secondary-pulley chamber 3c as secondary-pulley pressure Psec on one hand, and it is controlled by a shift control valve 25 and supplied to the primary-pulley chamber 2c as primary-pulley pressure Ppri. The pressure regulating valve 23 controls the line pressure $P_L$ in accordance with the drive duty for a solenoid 23a, whereas the pressure reducing valve 24 controls the secondary-pulley chamber Psec in accordance with the drive duty for a solenoid 24a.

The shift control valve 25 has a neutral position 25a, a pressure increasing position 25b, and a pressure reducing position 25c. For switching of the valve positions, the shift control valve 25 is coupled to a shift link 26 roughly in the middle thereof, the shift link 26 having one end coupled to a step motor or shift actuator 27 and another end coupled to the movable flange 2b of the primary pulley 2. The step motor 27 is put in an operated position advanced with respect to a reference position by the step number Step corresponding to the target shift ratio. By such operation of the step motor 27, the shift link 26 swings with a junction with the movable flange 2b as the fulcrum, moving the operated position of the shift control valve 25 from the neutral position 25a to the pressure increasing position 25b or the pressure reducing position 25c. As a result, when a target shift ratio is on the high-speed or upshift side, the line pressure $P_L$ communicates with the primary-pulley pressure Ppri, whereas when a target shift ratio is on the low-speed or downshift side, the primary-pulley pressure Ppri communicates with a drain. With this, the primary-pulley pressure Ppri is increased by the line pressure $P_L$ as source pressure, or decreased by drain to cause change in differential pressure between the primary-pulley pressure Ppri and the secondary-pulley pressure Psec, producing upshift to a high-side shift ratio or downshift to a low-side shift ratio, thus achieving shift toward the target shift ratio.

Development of shift is fed back to a corresponding end of the shift link 26 through the movable flange 2c of the primary pulley 2, so that the shift link 26 swings with a junction with the step motor 27 as the fulcrum in the direction of returning the shift control valve 25 from the pressure increasing position 25b or the pressure reducing position 25c to the neutral position 25a. With this, the shift control valve 25 is returned to the neutral position 25a when achieving the target shift ratio, allowing maintaining of the target shift ratio. When the primary pulley 2 is located at the lowest position, a mechanical stopper, not shown, provides a reaction force to the primary pulley 2 regardless of the presence or absence of the primary-pulley pressure Ppri, thus securing ion torque capacity of the V-belt 4.

The transmission ECU 12 carries out the determination of the solenoid drive duty of the pressure regulating valve 23, the solenoid drive duty of the pressure reducing valve 24, and a shift command or step number Step to the step motor 27 as well as the determination as to whether or not the engagement pressure is supplied to the forward clutch 7b and the reverse brake 7c as shown in FIG. 1. As shown in FIG. 2, the transmission ECU 12 comprises a pressure control part 12a and a shift control part 12b. The pressure control part 12a determines the solenoid drive duty of the pressure regulating valve 23 and the solenoid drive duty of the pressure reducing valve 24, whereas the shift control part 12b determines the step number Step of the step motor 27 as follows.

First, using the vehicle velocity which can be obtained from the secondary-pulley rotational speed Nsec and the accelerator-pedal depression amount APO, the shift control part 12b determines a target input rotational speed in accordance with a given shift map. The determined target input rotational speed is divided by the secondary-pulley rotational speed Nsec to determine a target shift ratio in accordance with the driving conditions such as the vehicle velocity and the accelerator-pedal depression amount APO. Then, the primary-pulley rotational speed Npri is divided by the secondary-pulley rotational speed Nsec to obtain an actual or achieved shift ratio, which is corrected in accordance with a deviation with respect to the target shift ratio, thus determining a shift-ratio command for gradually bringing the actual shift ratio nearer to the target shift ratio at target shift velocity. A step number or operated position Astep of the step motor 27 is determined to achieve the shift-ratio command, which is provided to the step motor 27, thus achieving the target shift ratio through the above shift action.

Typically, the step motor 27 is initialized at start of the engine 5. Generally, initialization is carried out by moving the step motor 27 to the low-speed side, i.e. to the downshift side. In this embodiment, in order to prevent belt slippage at engine restart after tractive cruising, control is carried out at engine start along the procedure as shown in FIG. 3.

Figure 3:
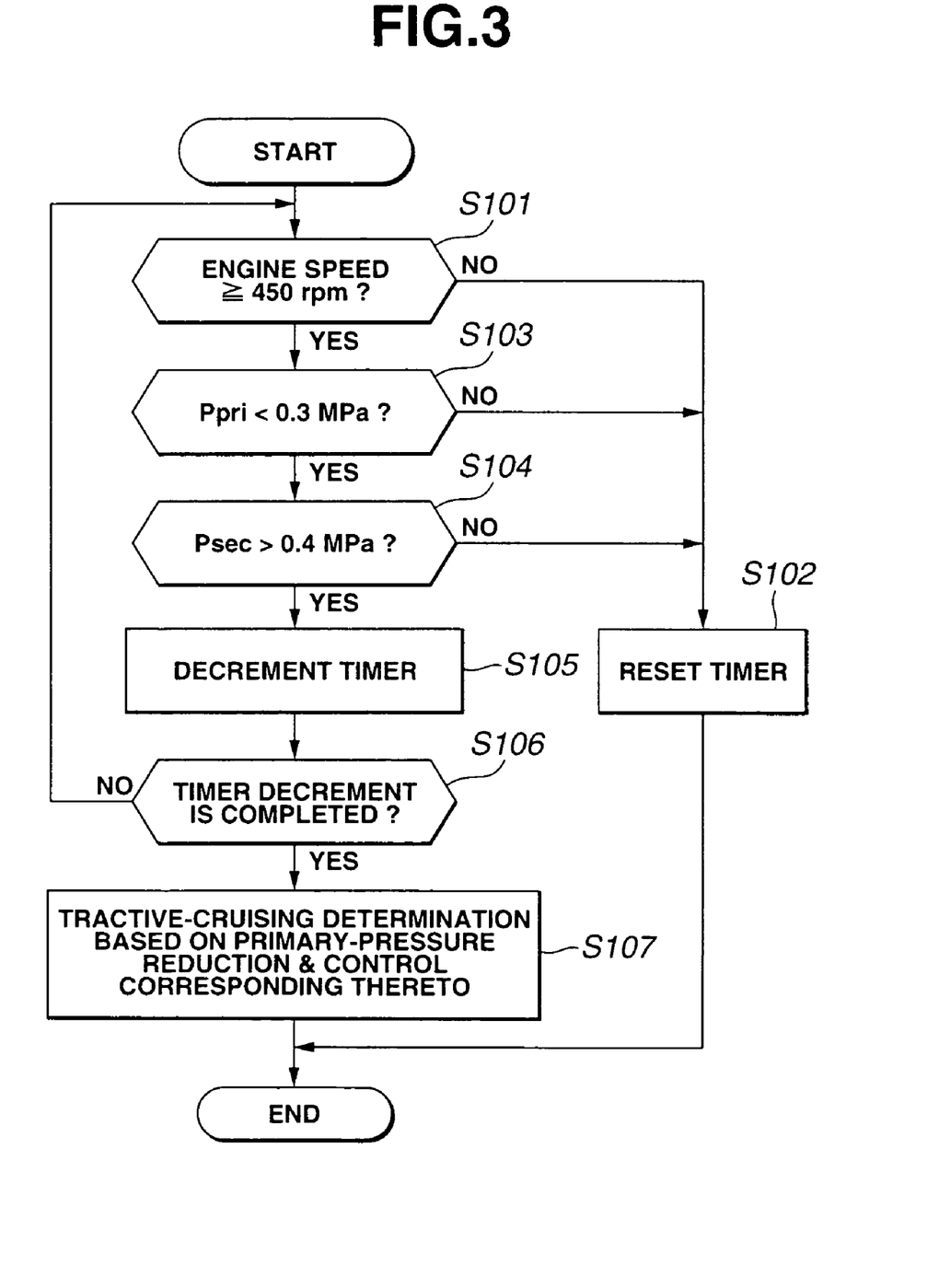
FIG. 3 is a flow chart showing operation of the embodiment.

Referring to FIG. 3, control carried out at engine start is described. At a step S101, the engine speed is input from the engine ECU, and it is determined whether or not the engine speed is equal to or greater than a predetermined value which is set at 450 rpm, for example, i.e. the engine 5 starts. If it is determined that the engine speed <450 rpm, flow proceeds to a step S102 where a timer is reset to zero, then flow comes to an end. The timer serves to measure a time for determining whether or not the primary-pulley pressure Ppri increases to a predetermined value within a predetermined period subsequent to engine start. On the other hand, if it is determined that the engine speed $\geq$450 rpm, flow proceeds to a step S103.

At the step S103, it is determined whether or not the primary-pulley pressure Ppri is smaller than a predetermined value which is set at 0.3 MPa, for example. If it is determined that Ppri$\geq$0.3 MPa, flow proceeds to the step 102 where the timer is reset to zero, then flow comes to an end. On the other hand, if it is determined that Ppri<0.3 MPa, flow proceeds to a step S104.

At the step S104, it is determined whether or not the secondary-pulley pressure Psec is greater than a predetermined value which is set at 0.4 MPa, for example. If it is determined that Psec>0.4 MPa, flow proceeds to the step S102 where the timer is reset to zero, then flow comes to an end. On the other hand, if it is determined that Psec$\leq$0.4 MPa, flow proceeds a step S105.

At the step S105, the timer is decremented. At a subsequent step S106, it is determined whether or not timer decrement is completed, i.e. a predetermined time has elapsed. The predetermined time can be changed in accordance with the temperature of working oil used in a hydraulic system of the CVT 1. At the step S106, if it is determined that timer decrement is not completed, flow returns to the step S101 to repeatedly carry out control at the steps S101 to S106, whereas if it is determined that timer decrement is completed, i.e. a predetermined time has elapsed, flow proceeds to a step S107.

At the step S107, since the control result reveals that the primary-pulley pressure Ppri does not increase to the predetermined value within the predetermined period, it is determined that this engine start is involved in engine restart after tractive cruising, and control corresponding to engine restart after tractive cruising is carried out, then flow comes to an end.

Figure 4:
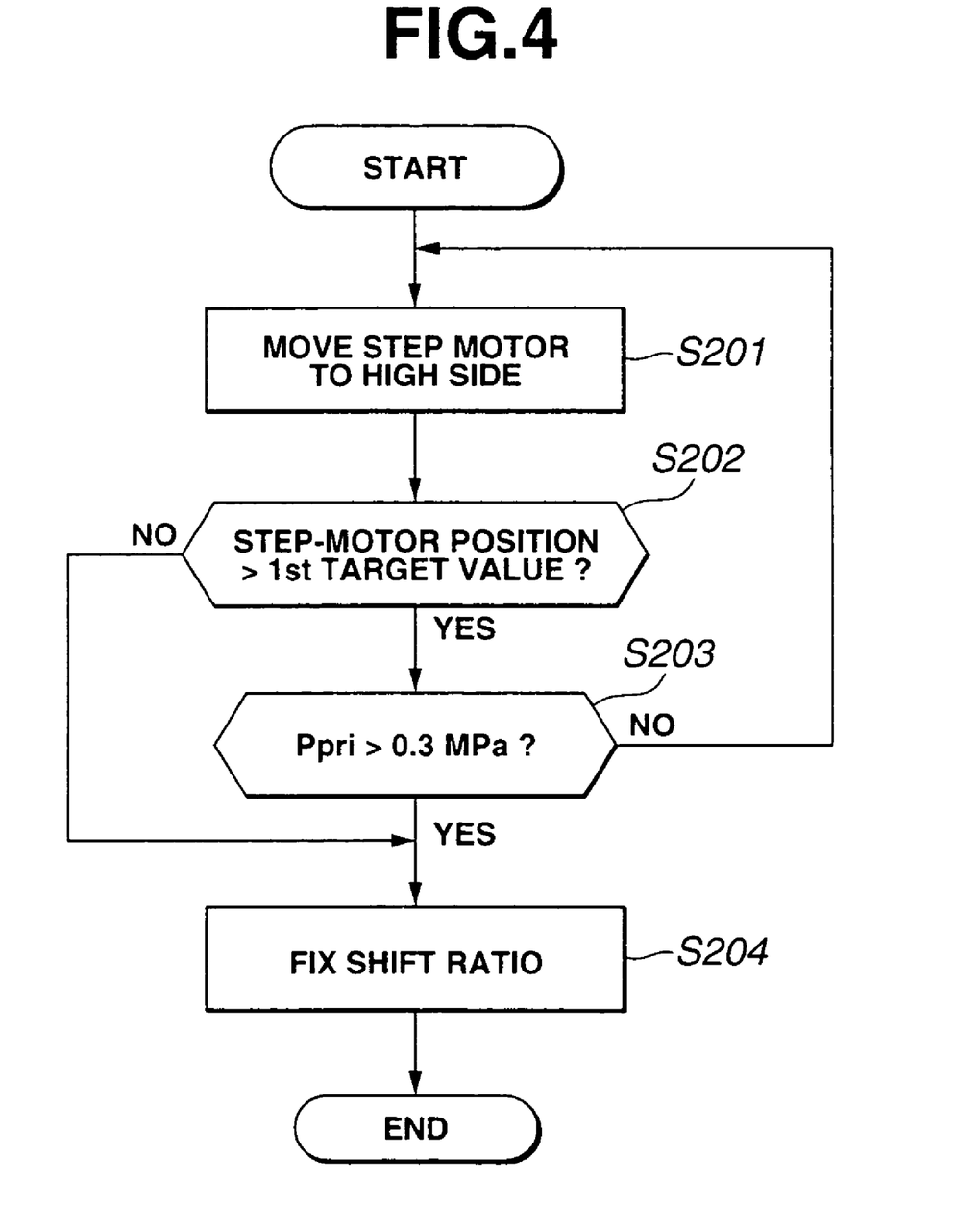
FIG. 4 is a chart similar to FIG. 3, showing operation of the embodiment.

Referring to FIG. 4, a description is made about control at the step S107 in FIG. 3, i.e. control corresponding to engine restart after tractive cruising. At a step S201, the step motor 2 is moved to a first target position on the high side at a predetermined speed. Specifically, the step motor 2 is driven with the primary pulley 2 as the fulcrum to change the shift control valve 25 from the state that a drain port and a line-pressure port are in communication to the state that the line-pressure port and a primary-pulley pressure port are in communication. The first target position is located on the high side with respect to a step-motor position corresponding to the shift ratio achieved by slightly moving back the shift ratio during tractive cruising to the low side by the secondary-pulley pressure Psec produced at engine start after tractive cruising, and corresponds to the shift ratio which does not impair vehicle start-ability. The first target position is, for example, a step-motor position corresponding to the shift ratio of about 1.5.

At a subsequent step S202, it is determined whether or not the operated position Astep of the step motor 27 is greater than the first target position, i.e. the step motor 27 reaches the position corresponding to the shift ratio which does not impair vehicle start-ability. This prevents impairment of the vehicle start-ability due to excessive movement of the step motor 27 to the high side. As will be described later, the step-motor position is fixed until the vehicle velocity reaches a predetermined value after vehicle start to set a restriction to the shift ratio, preventing occurrence of downshift. At the step S202, if it is determined that the operated position Astep is greater than the first target position, flow proceeds to a step S203, whereas if it is determined that the operated position Astep is equal to or smaller than the first target position, flow proceeds to a step S204.

At the step S203, it is determined whether or not the primary-pulley pressure Ppri is greater than a predetermined value which is set at 0.3 MPa in the same manner as the step S103. If it is determined that Ppri>0.3 MPa, it is determined that the primary-pulley pressure Ppri rises up to a required value, and flow proceeds to the step S204. On the other hand, if It is determined that Ppri$\leq$0.3 MPa, it is determined that a rise of the primary-pulley pressure Ppri delays, and flow returns to the step S201 to repeatedly carry out control at the steps S201 to S203.

At the step S204, the shift ratio is fixed to a value at this point, then flow comes to an end. The fixed shift-ratio value is maintained until the vehicle velocity reaches a predetermined value after vehicle start or during a predetermined period.

Figure 5:
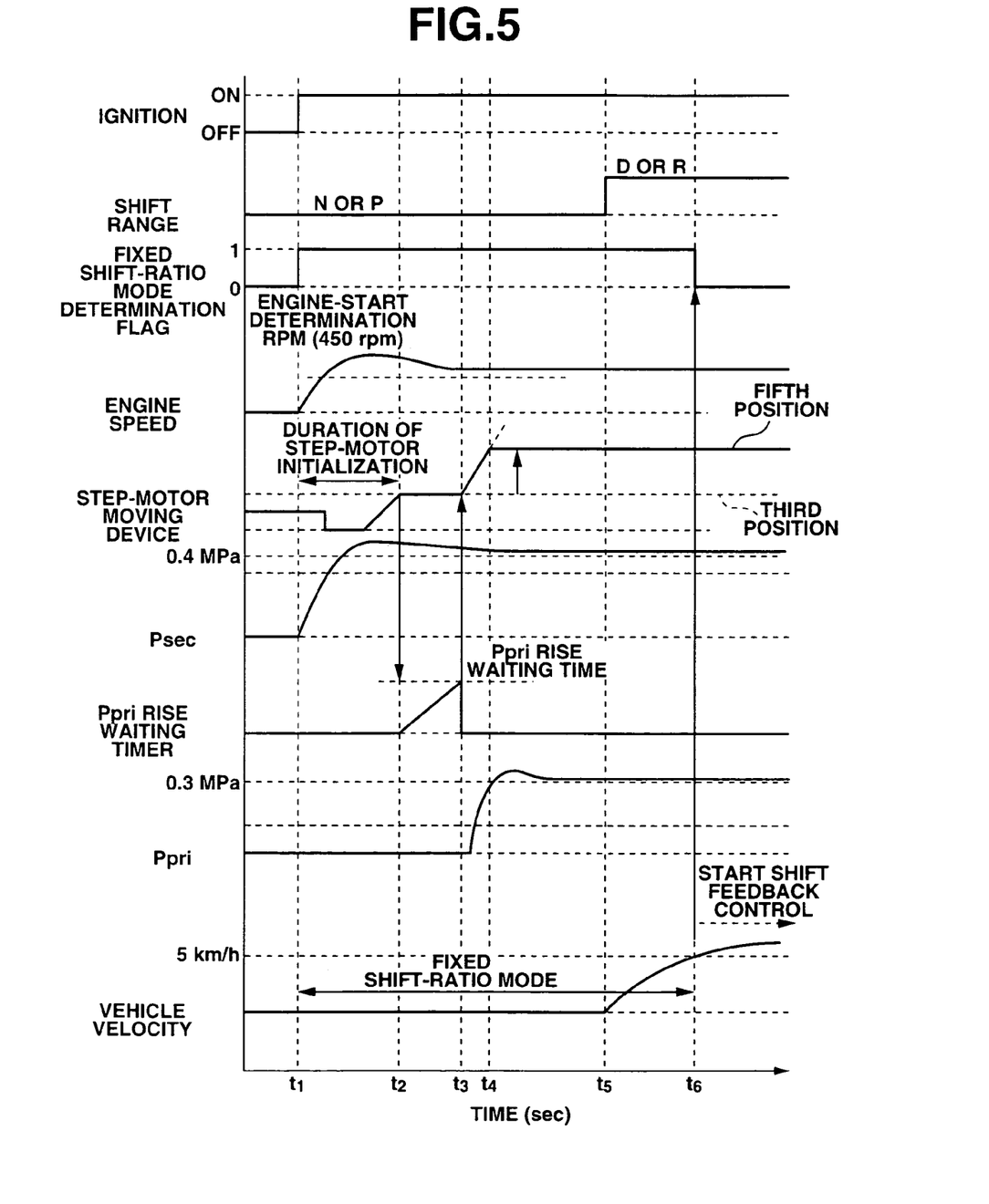
FIG. 5 is a time chart showing control from engine start to vehicle start.

Referring to FIG. 5, a time chart shows a change in engine speed, step-motor moving position, primary-pulley pressure Ppri, secondary-pulley pressure Psec, and vehicle velocity with respect to time from engine start to vehicle start, particularly, when the primary-pulley pressure Ppri reaches a predetermined value within a predetermined period.

Referring to FIG. 5, with the shift range in neutral N or parking P, the engine 5 is started, i.e. an ignition key is turned on, at point t1. The engine speed increases to reach then a predetermined rotational speed (450 rpm). With engine start, the step motor 27 is initialized during a period from point t1 to point t2. Then, with the position of the step motor 27 fixed to a position or third position corresponding to the lowest shift ratio, a rise of the primary-pulley pressure Ppri is waited during a predetermined period from point t2 to point t3. At point t3, the step motor 27 is started to move.

With engine start and movement of the step motor 27 to the high side, the primary-pulley pressure Ppri and the secondary-pulley pressure Psec increase to respective predetermined values, wherein the primary-pulley pressure Ppri reaches a predetermined value (0.3 MPa) before point t4. At point t4, the step motor 27 is stopped to move, and is fixed at this position or fifth position until the vehicle velocity reaches a predetermined value subsequent to engine start at point t1. This corresponds to a fixed shift-ratio mode.

Then, at point t5, the driver switches the shift range to drive D or reverse R to start the vehicle. And when the vehicle velocity reaches a predetermined value (5 km/h) at point t6, control is switched from the fixed shift-ratio mode to shift feedback control. Determination of this switching is carried out in accordance with a value of a fixed shift-ratio mode determination flag. In this embodiment, the flag has a value of 1 at engine start, which is switched to 0 when the vehicle velocity reaches 5 km/h.

Figure 6:
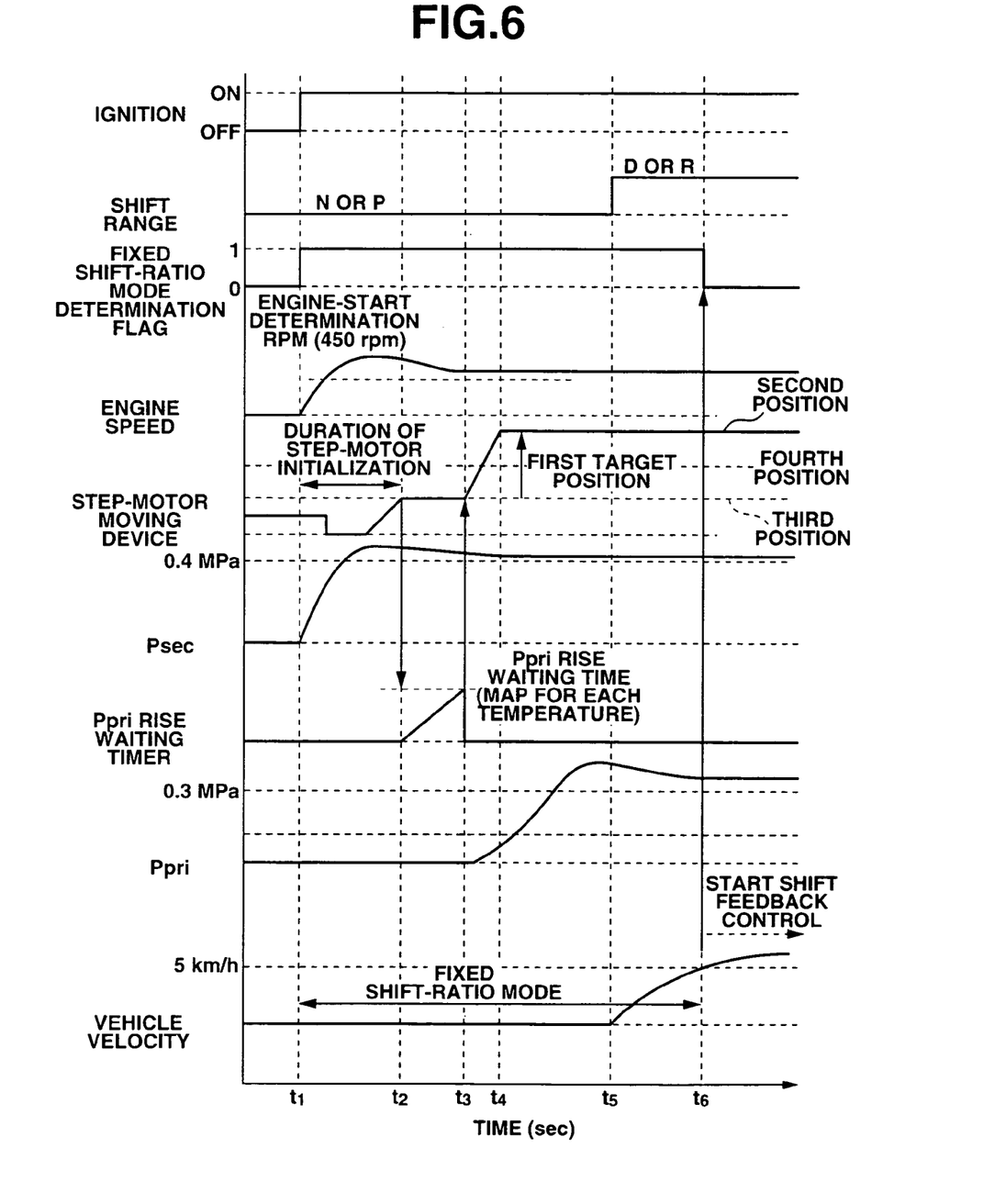
FIG. 6 is a chart similar to FIG. 5, showing control from engine start to vehicle start.

Referring to FIG. 6, like FIG. 5, a time chart shows a change in engine speed, step-motor moving position, primary-pulley pressure Ppri, secondary-pulley pressure Psec, and vehicle velocity with respect to time from engine start to vehicle start, particularly, when the primary-pulley pressure Ppri does not reach a predetermined value within a predetermined period.

Referring to FIG. 6, with engine start and movement of the step motor 27 to the high side, the primary-pulley pressure Ppri and the secondary-pulley pressure Psec increase. However, even after time elapses over point t4 shown in FIG. 5, the primary-pulley pressure Ppri does not reach a predetermined value (0.3 MPa). Therefore, at a step-motor moving position which is located on the high side with respect to a step-motor position or fourth position corresponding to the shift ratio achieved by slightly moving back the shift ratio during tractive cruising to the low side by the secondary-pulley pressure Psec produced at engine start after tractive cruising, and corresponds to the shift ratio which does not impair vehicle start-ability, i.e. at a moment (point t4') when the step motor 27 reaches a predetermined position at the step S202 in FIG. 4, the step motor 27 is stopped to move, and fixed at this position or second position.

Then, the primary-pulley pressure Ppri reaches a predetermined value, and the driver switches the shift range to drive D or reverse R at time t5 in the same manner as FIG. 5, starting the vehicle. And when the vehicle velocity reaches a predetermined value (5 km/h) at time t6, control is switched from the fixed shift-ratio mode to shift feedback control.

Figure 7:
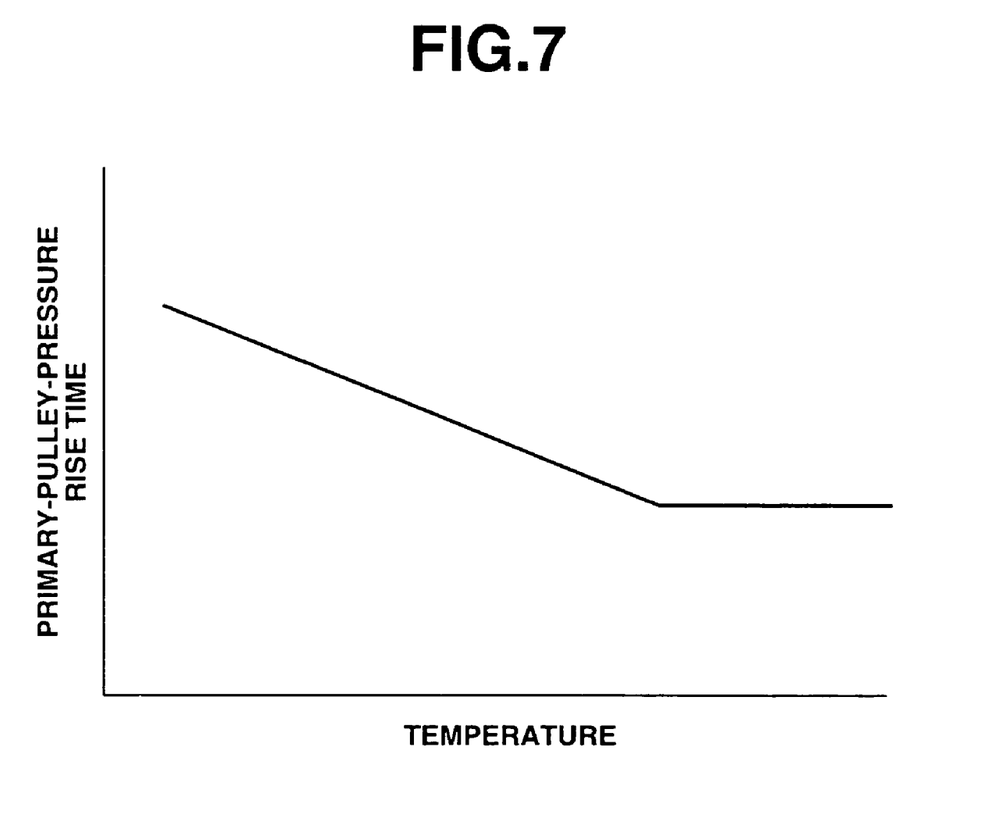
FIG. 7 is a graph illustrating the relationship between an oil temperature and a primary-pulley-pressure rise time.

In the embodiment, a time required for the primary-pulley pressure Ppri to reach a predetermined value subsequent to engine start after tractive cruising, i.e. a waiting time, may be changed in accordance with the oil temperature. Referring to FIG. 7, a graph shows a relationship between the oil temperature and the waiting time in the embodiment. In the embodiment, the lower the oil temperature is, the longer the waiting time is, which is determined to cope with engine start in cold climates and in the winter season. Conversely, the higher the oil temperature is, the shorter the waiting time is, so that the possibility of erroneous determination in the above control can be reduced, resulting in movement of the step motor 27 to the high side and thus prevention of a reduction in vehicle start-ability.

As described above, in the embodiment, when the primary-pulley pressure does not reach a predetermined value within a predetermined period subsequent to engine start, the step motor for changing the width of the V-grooves of the primary and secondary pulleys by applying the hydraulic pressure to the pulleys in accordance with a target shift ratio is moved to the high-speed side with respect to an ordinary operated position. With this, even if the primary pulley is located on the high-speed side with respect to the lowest position at engine start due to tractive cruising and the like, a situation can be prevented that the primary-pulley pressure is not supplied until the vehicle is started to drive the step motor in the upshift direction, resulting in prevention of occurrence of belt slippage.

Further, the step-motor operated position corresponding to the high-speed-side shift ratio is located on the high-speed side with respect to the operated position corresponding to the shift ratio achieved by moving back the shift ratio during tractive cruising to the low side by the secondary-pulley pressure produced at engine start after tractive cruising. Therefore, when the engine is restarted with the primary pulley stopped at the shift-ratio position on the high-speed side due to tractive cruising and the like, the step-motor operated position is maintained at that position or moved in the upshift direction, and thus is located on the high-speed side with respect to a stop position of the primary pulley and fixed at this position, allowing sure prevention of occurrence of belt slippage and downshift due to insufficient primary-pulley pressure.

Furthermore, when the primary-pulley pressure reaches the predetermined value before the step-motor operated position reaches an operated position corresponding to the shift ratio on the high-speed side, the step-motor operated position is fixed to an operated position when the primary-pulley pressure reaches the predetermined value. Thus, when the primary-pulley pressure increases before the step-motor operated position is located at a position corresponding to a predetermined shift ratio on the high-speed side, the step-motor operated position is fixed at this position, and is inhibited from further moving to the high-speed side. This allows prevention of excessive movement of the step motor to the high-speed side to have the shift ratio at vehicle start after tractive cruising excessively be on the high-speed side, thus leading to the prevention of both the occurrence of downshift and the impairment of the vehicle start-ability.

Moreover, the predetermined period after engine start can be changed in accordance with the oil temperature. Thus, when having a particular vehicle operation environment, for example, low oil temperature which can be seen in cold climates and in the winter season, delay of a rise of the primary-pulley pressure can be detected appropriately to cope therewith.

Having described the present invention in connection with the illustrative embodiments, it is noted that the present invention is not limited thereto, and various changes and modifications can be made without departing from the scope of the present invention.

The entire teachings of Japanese Patent Application P2002-288396 filed Oct. 1, 2002 are incorporated hereby by reference.

What is claimed is:

1. A system for controlling a V-belt type continuously variable transmission (CVT) for a vehicle with an engine, comprising:

primary and secondary pulleys arranged on input and output sides, the pulleys having V-grooves, the pulleys having primary-pulley and secondary-pulley chambers defined at least by movable flanges, the primary-pulley and secondary-pulley chambers being subjected to primary-pulley and secondary-pulley pressures produced from a line pressure;

a V-belt looped over the primary and secondary pulleys to engage in the V-grooves;

a shift control valve arranged to move in such a manner to vary the primary-pulley pressure and to vary a width of the V-groove of the primary-pulley;

a shift link that mechanically links the movable flange of the primary pulley and the shift control valve;

return springs arranged in the primary-pulley and secondary-pulley chambers, respectively, in such a manner to bring the primary and secondary pulleys into a predetermined shift ratio during tractive cruising of the vehicle;

a shift actuator mechanically linked with the shift link and arranged to move so as to vary a relationship between position of the shift control valve and position of the movable flange of the primary pulley; and an electronic control unit (ECU) which controls the shift actuator in such a manner to conform a shift ratio obtained from a rotational-speed ratio between the primary and secondary pulleys to a target shift ratio, the ECU being so programmed as to:

determine if the primary-pulley pressure reaches a predetermined value within a predetermined period after a start of the engine; and move the shift actuator to a first position corresponding to a first target shift ratio if it is determined that the primary-pulley pressure fails to reach the predetermined value within the predetermined period, the first position being on a high-speed side with respect to a second position to be occupied by the shift actuator when the primary-pulley pressure reaches the predetermined value within the predetermined period, and being close to the predetermined shift ratio during tractive cruising of the vehicle.

2. The system as claimed in claim 1, wherein the first position of the shift actuator is located on the high-speed side with respect to a third position of the shift actuator corresponding to the shift ratio achieved by moving back the shift ratio during a tractive cruising of the vehicle by the secondary-pulley pressure produced at the start of the engine after the tractive cruising.

3. The system as claimed in claim 1, wherein if it is determined that the primary-pulley pressure reaches the predetermined value before the shift actuator reaches the first position, the ECU fixes the shift actuator at a fourth position occupied at that time.

4. The system as claimed in claim 1, wherein the predetermined period of the primary-pulley pressure is changed in accordance with an oil temperature.

5. The system as claimed in claim 1, wherein if it is determined that the primary-pulley pressure reaches the predetermined value before the shift actuator reaches the first position, the ECU fixes the target shift ratio after that time.

6. A vehicle, comprising:

an engine;

a V-belt type continuously variable transmission (CVT), comprising:

primary and secondary pulleys arranged on input and output sides, the pulleys having V-grooves, the pulleys having primary-pulleys and secondary-pulley chambers defined at least by movable flanges, the primary-pulley and secondary-pulley chambers being subjected to primary-pulley and secondary-pulley pressures produced from a line pressure;

a V-belt looped over the primary and secondary pulleys to engage in the V-grooves;

a shift control valve arranged to move in such a manner to vary the primary-pulley pressure and to vary a width of the V-groove of the primary-pulley;

a shift link that mechanically links the movable flange of the primary pulley and the shift control valve;

return springs arranged in the primary-pulley and secondary-pulley chambers, respectively, in such a manner to bring the primary and secondary pulleys into a predetermined shift ratio during tractive cruising of the vehicle;

a shift actuator mechanically linked with the shift link and arranged to move so at to vary a relationship between position of the shift control valve and position of the movable flange of the primary pulley; and an electronic control unit (ECU) which controls the shift actuator in such a manner to conform a shift ratio obtained from a rotational-speed ratio between the primary and secondary pulleys to a target shift ratio, the ECU being so programmed as to:

determine if a tractive cruising of the vehicle is carried out during a stop of the engine; and move the shift actuator to a first position corresponding to a first target shift ratio if it is determined that the tractive cruising is carried out during the stop of the engine, the first position being on a high-speed side with respect to a second position to be occupied by the shift actuator when the tractive cruising fails to be carried out during the stop of the engine, and being close to the predetermined shift ratio during tractive cruising of the vehicle.

7. The vehicle as claim 6, wherein the first position of the shift actuator is located on the high-speed side with respect to a third position of the shift actuator corresponding to the shift ratio achieved by moving back the shift ratio during the tractive cruising of the vehicle by the secondary-pulley pressure produced at a start of the engine after the tractive cruising.

8. The vehicle as claimed in claim 6, wherein the ECU determines if the primary-pulley pressure reaches a predetermined value within a predetermined period after a start of the engine.

9. The vehicle as claimed in claim 8, wherein if it is determined that the primary-pulley pressure reaches the predetermined value before the shift actuator reaches the first position, the ECU fixes the shift actuator at a fourth position occupied at that time.

10. The vehicle as claimed in claim 8, wherein if it is determined that the primary-pulley pressure fails to reach the predetermined value, the ECU determines that the tractive cruising of the vehicle is carried out during the stop of the engine.

11. The vehicle as claimed in claim 8, wherein the predetermined period of the primary-pulley pressure is changed in accordance with an oil temperature.

12. The vehicle as claimed in claim 8, wherein if it is determined that the primary-pulley pressure reaches the predetermined value before the shift actuator reaches the first position, the ECU fixes the target shift ratio after that time.

13. A method of controlling a V-belt type continuously variable transmission (CVT) for a vehicle with an engine, the CVT comprising:
   primary and secondary pulleys arranged on input and output sides, the pulleys having V-grooves, the pulleys having primary-pulley and secondary-pulley chambers defined at least by movable flanges, the primary-pulley and secondary-pulley chambers being subjected to primary-pulley and secondary-pulley pressures produced from a line pressure;
   a V-belt looped over the primary and secondary pulleys to engage in the V-grooves;
   a shift control valve arranged to move in such a manner to vary the primary-pulley pressure and to vary a width of the V-groove of the primary-pulley;
   a shift link that mechanically links the movable flange of the primary pulley and the shift control valve;
   return springs arranged in the primary-pulley and secondary-pulley chambers, respectively, in such a manner to bring the primary and secondary pulleys into a predetermined shift ratio during tractive cruising of the vehicle; and
   a shift actuator mechanically linked with the shift link and arranged to move so as to vary a relationship between position of the shift control valve and position of the movable flange of the primary pulley,
   the method comprising:
   conforming a shift ratio obtained from a rotational-speed ratio between the primary and secondary pulleys to a target shift ratio;
   determining if the primary-pulley pressure reaches a predetermined value within a predetermined period after a start of the engine; and
   moving the shift actuator to a first position corresponding to a first target shift ratio if it is determined that the primary-pulley pressure fails to reach the predetermined value within the predetermined period, the first position being on a high-speed side with respect to a second position to be occupied by the shift actuator when the primary-pulley pressure reaches the predetermined value within the predetermined period, and being close to the predetermined shift ratio during tractive cruising of the vehicle.

14. The method as claimed in claim 13, wherein the first position of the shift actuator is located on the high-speed side with respect to a third position of the shift actuator corresponding to the shift ratio achieved by moving back the shift ratio during a tractive cruising of the vehicle by the secondary-pulley pressure produced at the start of the engine after the tractive cruising.

15. The method as claimed in claim 13, further comprising:
   if it is determined that the primary-pulley pressure reaches the predetermined value before the shift actuator reaches the first position, fixing the shift actuator at a fourth position occupied at that time.

16. The method as claimed in claim 13, wherein the predetermined period of the primary-pulley pressure is changed in accordance with an oil temperature.

17. The method as claimed in claim 13, further comprising:
   if it is determined that the primary-pulley pressure reaches the predetermined value before the shift actuator reaches the first position, fixing the target shift ratio after that time.

* * * * *